Nov. 27, 1934.  F. I. ROWLEY  1,982,354
ELECTRIC AUTOMATIC BRAKE CONTROL
Filed Sept. 12, 1931
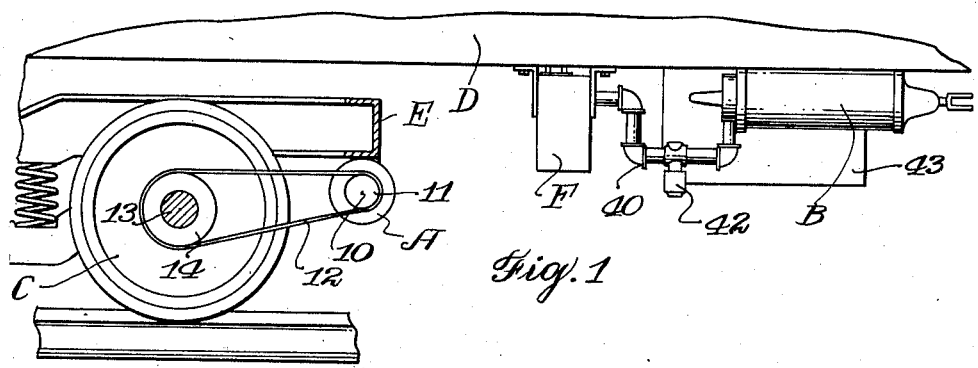
Fig. 1
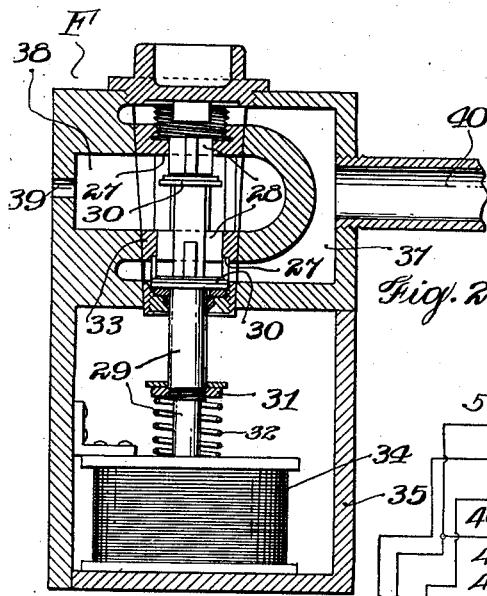
Fig. 2
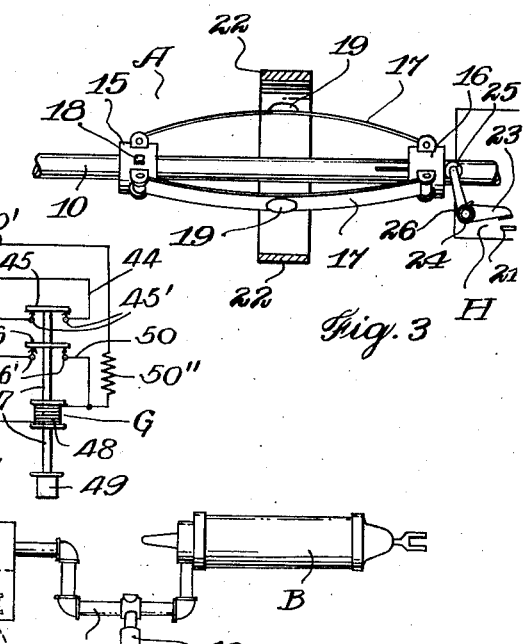
Fig. 3
Fig. 4
Inventor
Frederick I. Rowley
By Horace Pincher
Attorney Patented Nov. 27, 1934

1,982,354

UNITED STATES PATENT OFFICE 1,982,354

ELECTRIC AUTOMATIC BRAKE CONTROL

Frederick I. Rowley, St. Paul, Minn.

Application September 12, 1931, Serial No. 562,468

13 Claims. (Cl. 188—181)

This invention relates to an electric automatic brake control for regulating the brakes on railway cars so as to overcome the skidding of the wheels on the rails and prevent flattening of the same by a positive regulation of the air braking means.

A feature resides in electrical means operated by connection with the car wheels so that when the wheels began to skid on the track because of excess pressure in the brake cylinder which controls the brakes, the electrical operating means automatically relieves this pressure, permitting the skidding wheels to virtually instantly start to rotate. The operating means of my control is of a simple nature and by electrical circuits and timed relay means, my device may be cut out of operation and the air line of the brakes may be operated to set the brakes on the train while the same is standing still.

It is a feature to provide a balanced valve connected with the pressure side of a single acting brake cylinder which virtually instantly relieves excess braking pressure and this balanced valve is controlled by a suitable governor which operates an electric circuit to operate the balanced valve in a manner so that the excess pressure in the brake cylinder may be relieved even when the train is traveling at a slow speed, like three or four miles an hour, or any rate of speed for which my electric automatic brake control is set. Excess pressure in the brake cylinder to the brakes is more dangerous when a train is moving at a slow speed, as it may be inclined to lock some of the brakes and skid the wheels. It is an important feature that my electric operating brake control may be set to operate to overcome this excess pressure in a very simple and effective manner. It is not delicate to easily get out of order and is positive in its operation to accomplish these very desirable results.

In the drawing forming a part of my specification:

Figure 1 is a diagrammatic view of the manner of attaching my governor to a car axle, and the relationship of the various parts of my device.

Figure 2 is a cross-sectional view through the center of my governor actuated valve.

Figure 3 is a side view, partly in section, of my governor.

Figure 4 is a diagrammatic view of my pressure controlling system.

My governor A is adapted to control the pressure in the brake cylinder B in a novel manner, to prevent skidding of the wheels C of the railway car D, and the consequences arising therefrom. The wearing of flat spots on the wheels is in this manner virtually eliminated.

The governor A is mounted upon the car truck frame E by means of suitable brackets. The shaft 10 of the governor A is equipped with a pulley or sprocket 11 for engagement with the special belt or chain 12 driven by the car wheel axle 13 by means of the pulley or sprocket 14. In this manner, the shaft 10 is driven by the chain 12 and rotates at all times when the axle 13 is in rotation. The speed of the shaft 10 depends entirely upon the size of the sprockets 11 and 14, and upon the speed of rotation of the axle 13, and suitable sprockets to provide a desired speed of rotation at the normal speed of the car can be inserted.

The governor A comprises a pair of collars 15 and 16 which are held in spaced relationship by pivoted flexible members 17. Each of the members 17 is pivoted at each end to one of the collars 15 or 16. The collar 15 is secured against movement upon the shaft 10 by means of the set screw 18. The other collar 16 may be held against turning upon the shaft 10, if desired, but is free to move longitudinally with the shaft 10. The members 17 are equipped with centrally mounted weights 19. As the speed of the shaft 10 increases, the collar 16 moves toward the collar 15, as the centrifugal force throws the weights 19 outwardly. A guard ring 22 prevents the weights from being thrown outwardly to too great an extent.

A swicth means H is mounted adjacent the movable end of the governor A. In preferred form, this switch means consists in a bell crank 23 pivoted at 24, and provided with a roller 25 which bears against the collar 16. A spring 26 keeps the roller always in contact with the collar 16. At the opposite end of the bell crank an electric switch contact 21 is provided which automatically closes when the governor A is virtually stopped by the skidding of the wheels C, and when the speed of the shaft 10 is raised by the rotation of the wheel C beyond a skidding point, then the governor automatically opens the switch 21.

A switch means H is mounted adjacent the D near the brake cylinder B. This valve is of a type known in the art as a balanced valve, being so constructed as to insure an equal pressure in opposite directions upon the valve stem when the valve is closed. Two valve seats 27 are provided, which uncover opposed passages 28 when the valve stem 29 is moved downwardly. The valve members 30 are normally kept in position upon their seats 27 within the core 33 containing the valves 30 by means of the spring 32, which is interposed between a suitable bracket on the top of the solenoid 34 and a nut 31 threaded upon the valve stem 29.

The valve F is operated by means of the solenoid 34 mounted within the casing 35 of the valve F. The solenoid 34 acts to draw the valve stem 29 downwardly into the position illustrated in Figure 2 of the drawing, opening the valve members 30 away from their seats 27, and permitting air from the air chamber 37 to pass through the passageways 28 into the exhaust chamber 38, from which it may escape through the opening 39 to the outer atmosphere.

The air chamber 37 is connected by a suitable air line 40 with the pressure end of the brake cylinder B. Thus when the valve F is in open position, compressed air in the brake cylinder B which would normally act to set the brakes on the car D will be relieved somewhat, and be exhausted to the atmosphere gradually as long as the valve F is in open position.

Interposed in the air line 40 is provided a safety air unloading or blow-down valve 42 which is used to control the blow-down of the brake cylinder air pressure. This valve is so connected in the air line 40 that, the pressure at the end of the brake cylinder B is transmitted to the chamber 37 of the valve F.

Within the body of the car D I provide a time relay switch G. This switch is for the purpose of controlling the length of time the valve F may remain open, and is connected with the valve F and the governor A in a manner which will be described in detail. The time limitation can be regulated to provide any desired length of duration for the holding of the valve F in open position.

With reference to Figure 4 of the drawing, the switch associated with the governor A, illustrated by the bell crank 23, is connected by the wire 44 to one of a pair of contacts 45', the other of which is connected by the wire 44'' to the solenoid 34. From this solenoid, a wire 44' leads through the battery 43 to the bell crank 23, completing the circuit. A second circuit is formed from the bell crank 23, through the wire 44' leading through the battery 43, through the wire 50 to the contacts 46'. From these contacts, the circuit extends to the solenoid 48, and then connects with the wire 44 extending to the other side of the bell crank 23, completing the circuit. A wire 50' containing a resistance 50'' is connected between opposite sides of the solenoid operated contacts 46'. Thus the solenoid 48 is energized through a circuit containing a resistance in series therewith, even when the contacts 46' are broken.

In operation, when the bell crank 23 closes the circuits, the solenoid 48 and the solenoid 34 are energized, as the core 47 of the solenoid 48 rests normally in the position disclosed, and the contact closing members 45 and 46 carried by the core 47 are in circuit closing position. A dashpot 49 associated with the core 47 prevents the core from moving up to break the contacts 45' and 46' for a short timed period. If the closing of the switch 23 has been caused by the stopping of the wheels momentarily, the switch 23 will open as soon as a small amount of air has been released by the valve operated by the solenoid 34. If the train has come to a stop, however, and the bell crank or switch 23 remains closed for more than a predetermined length of time, the dashpot will permit the core 47 of the solenoid 48 to raise, lifting the contact engaging members 45 and 46 and breaking the circuit to the solenoid 34, and directly to the solenoid 48. The wire 50' containing the resistance in series with the solenoid 48 will, however, remain to close the circuit to hold the core 47 elevated. As soon as the train starts in motion, the circuits are opened, and the core 47 drops. This device is one of a number of devices which will operate to provide the desired timed interval during which the air is released from the brake cylinder B.

In operation, when the pair of wheels C to which the governor A is connected begin to slide or skid, the shaft 10 virtually ceases rotation and the bell crank 23 forces the switch 21 closed. Thus the solenoid 34 is energized by current passing through the relay switch, the valve F opens, the high pressure in the brake cylinder B tending to make the wheels skid is thus virtually instantly relieved sufficiently to prevent skidding, the wheels C again begin to rotate, and the current to the relay switch G is cut off by the opening of the switch 21. With the opening of the switch 21 the valve F automatically closes, and no additional pressure is relieved through the valve F until the wheels would again tend to skid, whereupon the same operation would take place virtually instantly relieving the skidding of the wheels and thus this same operation would be repeated to overcome skidding to the point of injury to the wheels C.

The time relay switch is interposed in the wiring system for the purpose of cutting off the current to the solenoid 34 after a certain predetermined interval of time has elapsed. Thus after an interval of time, for example twenty seconds, if the shaft 10 is not rotating at a high enough speed to open the switch 21 and close the valve F, the valve will be cut out by the relay switch which cuts off the current to the solenoid 34 and permits the valve F to close by the force of the spring 32. Accordingly, when the train is standing still at a station where the track is inclined, full braking power may be used without interference of the governor controlled valve F, after this interval has elapsed.

My electric automatic brake control may be set so as to operate to relieve any high braking pressure against the wheels C when the train is operating below a speed of say four miles an hour, so as to prevent the skidding of the wheels C. Naturally at slow speeds the high braking pressure is more effective on the wheels C, tending to lock the same and causing them to skid on the rails. My electric automatic brake control overcomes this by relieving the excess pressure and the unloading valve 42 prevents any excess loss of air from the cylinder B. The valve 42 may be set to the pressure desired for operation. The excess or dangerous braking pressure in the cylinder B and line 40 which might tend to skid the wheels C is controlled by the balanced valve F in such a manner as to overcome skidding of the wheels C to cause flattening of the same.

My governor is preferably attached to a pair of wheels C which are provided with more braking power than the other wheels. This may be readily arranged by adjusting the brake rods in order to cause the brakes on the pair of wheels C to set slightly before the brakes on the other wheels. Accordingly, when the car slows to a speed of four or five miles an hour, the pair of wheels C, called the master wheels, skid or slide. Thus the automatic valve F opens when the car travels at a slow speed, causing the pressure in the brake cylinder to be relieved somewhat, and allowing the master wheels to again rotate. The danger of skidding any of the other wheels is thus obviated. The time relay prevents the holding open of the valve F during a long period of time when the car is stationary in the manner which has been described.

It is planned to have only one governor under each car, in the preferred form of my system, and to have this governor on the master wheels. It is obvious that these wheels will slide before the other wheels, and it would be virtually impossible to injure any other pair of wheels on the car because of skidding. Any pair of wheels can be used as master wheels by merely increasing the braking power thereupon.

I have shown and described my governor as being driven by means of a belt or chain. It is understood that other means, such as a system of gears, could be employed to rotate the governor. The governor can be mounted in any suitable position on the truck frame or upon the bottom of the car. The principle of operation in all cases is identical.

Thus my electric automatic brake control may be set to operate at the desired speed of travel of the train to which it is attached so as to control the wheels C and prevent damaging the same.

The principles of the electric brake control may be applied to other means within the scope of this invention, however, I have described the same as applied to wheels of railway trains or the like, where it is desirable to have a simple and effective means for controlling either all of the wheels of each of the cars, or such pairs of the wheels as may be desired, or such individual wheels as may be selected for controlling the air to the brakes of the particular car where my brake control is attached.

I have described the invention in accordance with the patent statutes and desire to have the same interpreted within the scope of the following claims.

I claim:

1. An electric automatic brake control comprising, a balanced air valve connected to the pressure head of the brake cylinder, and time controlled electrical means for operating said balanced valve for a period having a predetermined maximum to relieve excess braking pressure from the brake cylinder and prevent skidding of wheels controlled by the brake cylinder.

2. An electric control connected with the pressure head of an air brake cylinder for preventing skidding of wheels including, a balanced valve adapted to automatically relieve excess braking pressure in said cylinder, an air line between said valve and said cylinder, an unloading valve interposed in said air line between said cylinder and said balanced valve, and electrical means for automatically operating for a limited sustained period said balanced valve to relieve pressure in said air line and cylinder.

3. An automatic brake control for railway car wheels in combination with an air brake cylinder, an air line from the braking pressure side of said cylinder, a balanced valve connected to said air line, an unloading valve in said air line to prevent an excess of air escaping from said balanced valve, and time controlled electrical means for operating said balanced valve by the speed of rotation of the car wheels to cause said balanced valve to be automatically opened for a period having a predetermined maximum when the pressure in said brake cylinder reaches a danger or point of skidding of the car wheels.

4. An electric brake control in combination with railway car wheels including, an air valve, a brake cylinder, means for connecting said cylinder with said valve, electrical means for operating said valve, a governor controlled electric switch operable by the speed of said car wheels to cause said electric switch to close when the speed of operation of said wheels gets below a certain point, a timed electric circuit to said electrical means for operating said valve to hold said valve open for a predetermined period of time to relieve excess braking pressure in said brake cylinder to overcome skidding of said wheels, said timing circuit automatically shutting off said valve after a predetermined period of time to permit the normal operation of said brake cylinder when a train is standing still.

5. An electric brake control for railway wheels including, an air valve, a solenoid for operating said valve in one direction, spring means for urging said valve in the other direction, an electric timing circuit for controlling duration of operation of said solenoid for said valve, and an electric switch controlling the operation of said solenoid for said valve operable by the speed of rotation of the railway wheels.

6. An electric control for air brakes for railway wheels including, an electrically operated air relief valve associated with the air line to the brake cylinder, electrical timing means for timing the operation of said balancing air relief valve to relieve air pressure in said brake cylinder to cause the same to become ineffective after a predetermined period of time until it is again operated, and an electric circuit for controlling said relief valve operable by the speed of rotation of the car wheels of a railway train.

7. In an electric air control for air brake cylinders for railway cars including, an electrically operated means for relieving excess braking pressure in the air brake cylinder, means for controlling said electrical air relief means by a predetermined speed of the car wheels to prevent skidding and to obviate flattening thereof and a relief cutout operable at any pressure when the car is stopped.

8. An automatic air control for air brake cylinders for car wheels including, an electrically operated air relief, an electric circuit for operating said electrical air relief, a timer in said circuit for controlling the duration of the period of operation of said air relief, and means for controlling said air relief by a predetermined speed of the car wheels to relieve just sufficient air from the air brake cylinder to prevent skidding and to obviate a flattening of the car wheels.

9. A control for air brakes for railway car wheels including, an air relief valve associated with the air line to the brake cylinder, timing means for timing the operation of air relief by said air relief valve to cause the same to become ineffective after a predetermined period of time until it is again operated, and means operable by the speed of rotation of the car wheels for controlling said timing means.

10. A brake control for car wheels including, a normally closed balanced valve having means for relieving excess air pressure from the brake cylinder which controls the brakes to the wheels, means for opening said valve, time controlled means for closing said valve after it has been open for a limited period of time, said time controlled means being operable when excess brake pressure is sufficient to cause skidding of the wheels.

11. An electric brake control for the brakes of railway car wheels comprising, means in combination with the brake cylinder controlling the brakes for the car wheels including, a governor operable to close an electric switch at a predetermined speed of operation, means for controlling said governor by the speed of the railway car wheels, an electrically operated relief valve operable by said switch to relieve excess braking pressure in the brake cylinder and prevent skidding of the railway car wheels, and means for rendering said relief valve inoperable regardless of the position of said electric switch.

12. An electric control for air brakes for railway car wheels including, a normally closed air valve connected to the brake cylinder, an electric means for opening said air valve to relieve excess braking pressure in the brake cylinder to prevent skidding of the car wheels, and means operable to render said electric means inoperable, said last named means automatically actuated only during a prolonged application of braking pressure.

13. An anti-skid control for railway wheels including, an electric controlled air relief valve associated with the air brake cylinder, an open circuit for operating said relief valve including means controlled by the speed of rotation of the wheels to close said circuit to operate said relief valve when a predetermined minimum speed is reached, and means controlled by the duration of the application of braking pressure to open said circuit upon the prolongation of the application of braking pressure beyond a predetermined duration.

FREDERICK I. ROWLEY.